United States Patent [19]

Chernick

[11] 4,021,801
[45] May 3, 1977

[54] SINGLE BIT DOPPLER PROCESSOR FOR GUIDANCE MISSILE SYSTEM

[75] Inventor: Leon Chernick, Los Angeles, Calif.

[73] Assignee: The United States of America as represented by the Secretary of the Air Force, Washington, D.C.

[22] Filed: Mar. 3, 1971

[21] Appl. No.: 120,684

[52] U.S. Cl. .................. 343/5 DP; 235/150.2; 244/3.19

[51] Int. Cl.² ................ F41G 7/00; G01S 9/52

[58] Field of Search ....... 235/150.2, 150.5, 150.51, 235/61.5 S; 343/5 DP; 244/3.14, 3.19

[56] References Cited

UNITED STATES PATENTS

| | | | |
|---|---|---|---|
| 3,399,404 | 8/1968 | Githens et al. | 343/5 DP |
| 3,646,554 | 2/1972 | Fierston | 343/5 DP |
| 3,680,096 | 7/1972 | Bose | 343/5 DP |
| 3,798,590 | 3/1974 | Jacobson et al. | 343/5 DP |

*Primary Examiner*—Howard A. Birmiel
*Attorney, Agent, or Firm*—Joseph E. Rusz; Julian L. Siegel

[57] ABSTRACT

Hybrid digital processor of a missile guidance system in which the input spectrum is mixed, limited, sampled, and fed to a recirculating shift register. Sampled values of the shift register, with the same oscillator controlling the sampling rate of the limiter and the shift register, are mixed with a signal from a voltage controlled oscillator and fed to a threshold pulse generator which is connected to a sampling logic circuit that feeds a series of counters.

2 Claims, 7 Drawing Figures

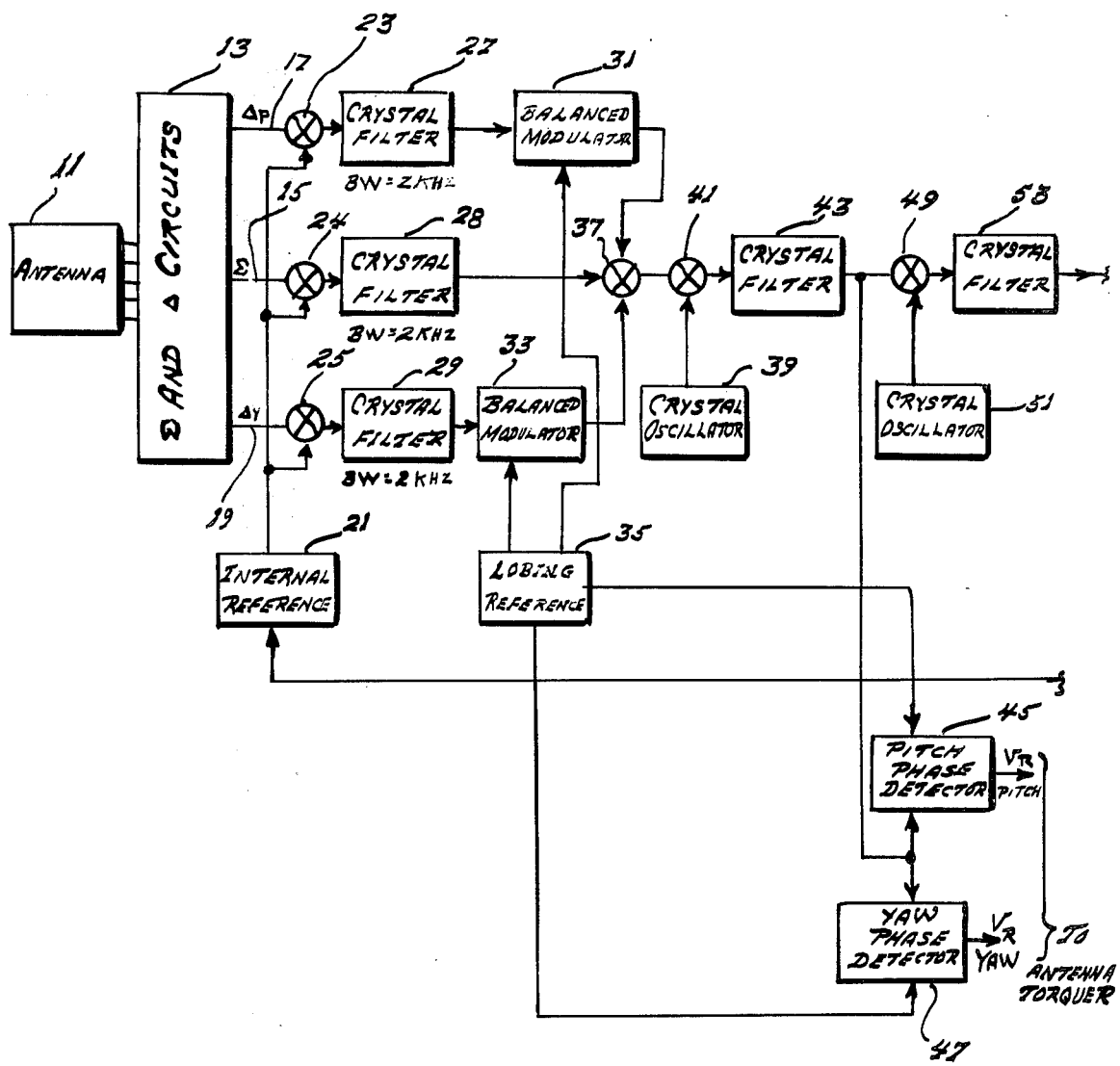
FIG. 3-a

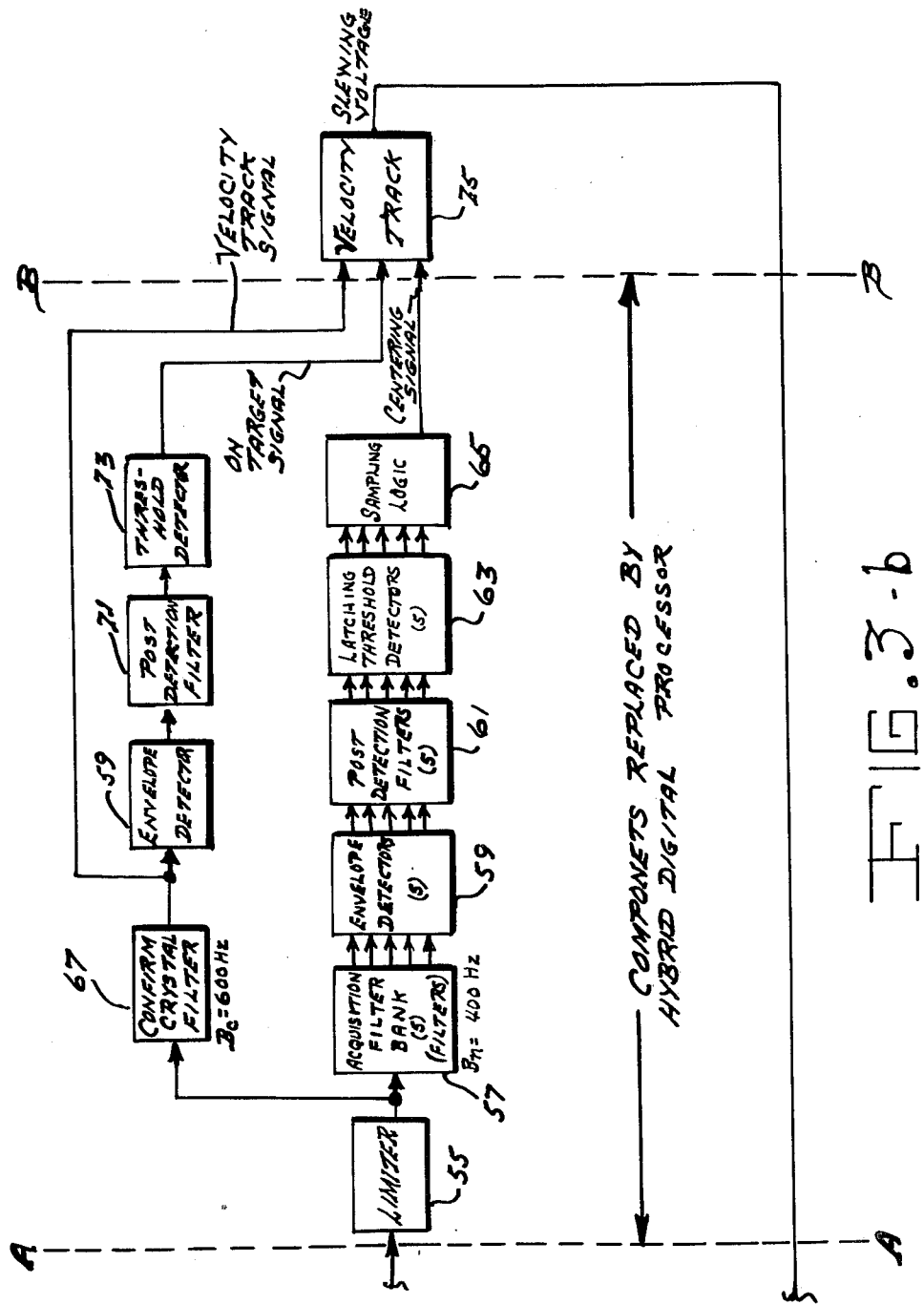
FIG. 3-b

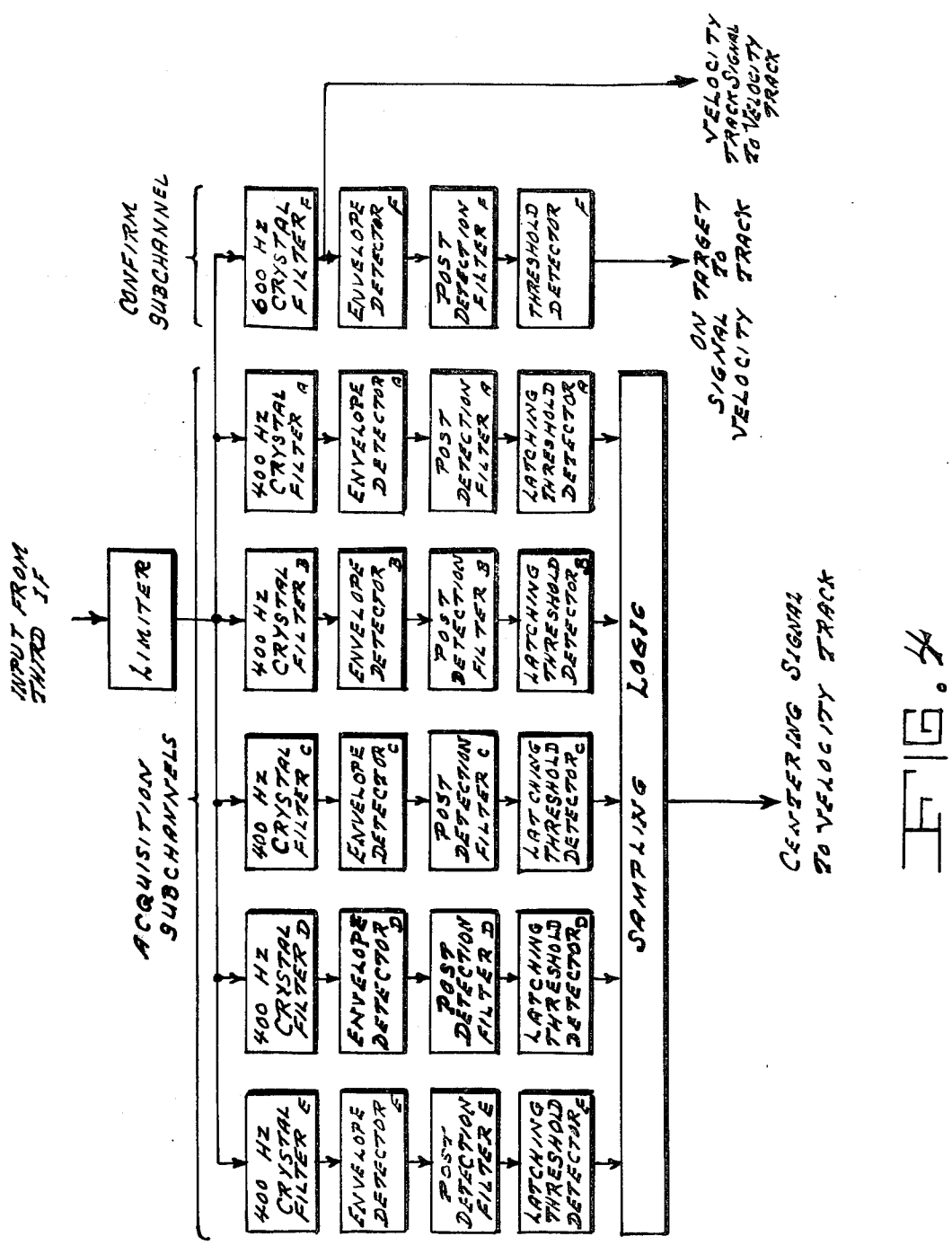

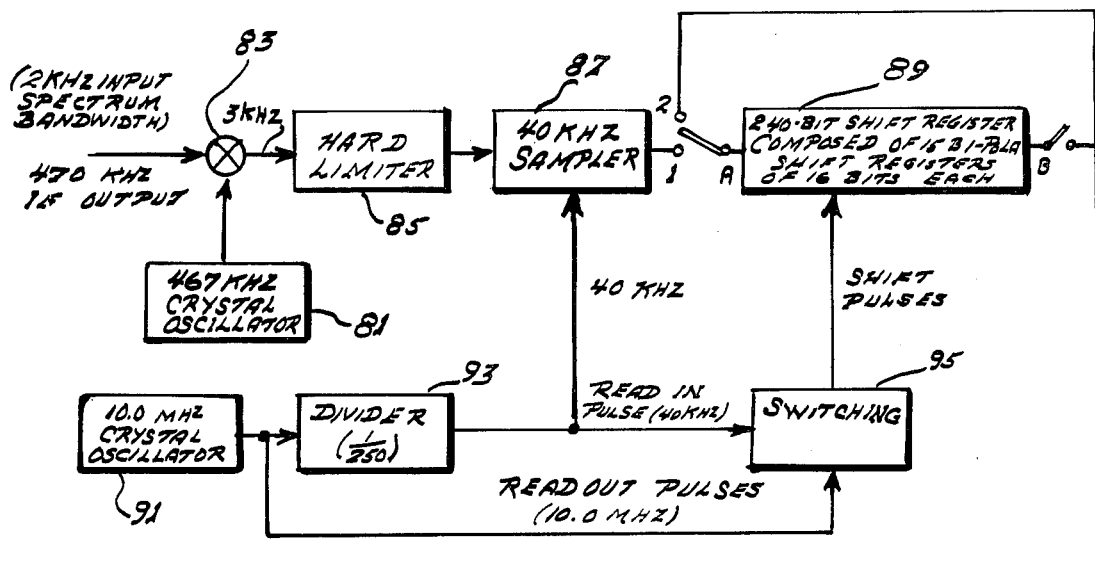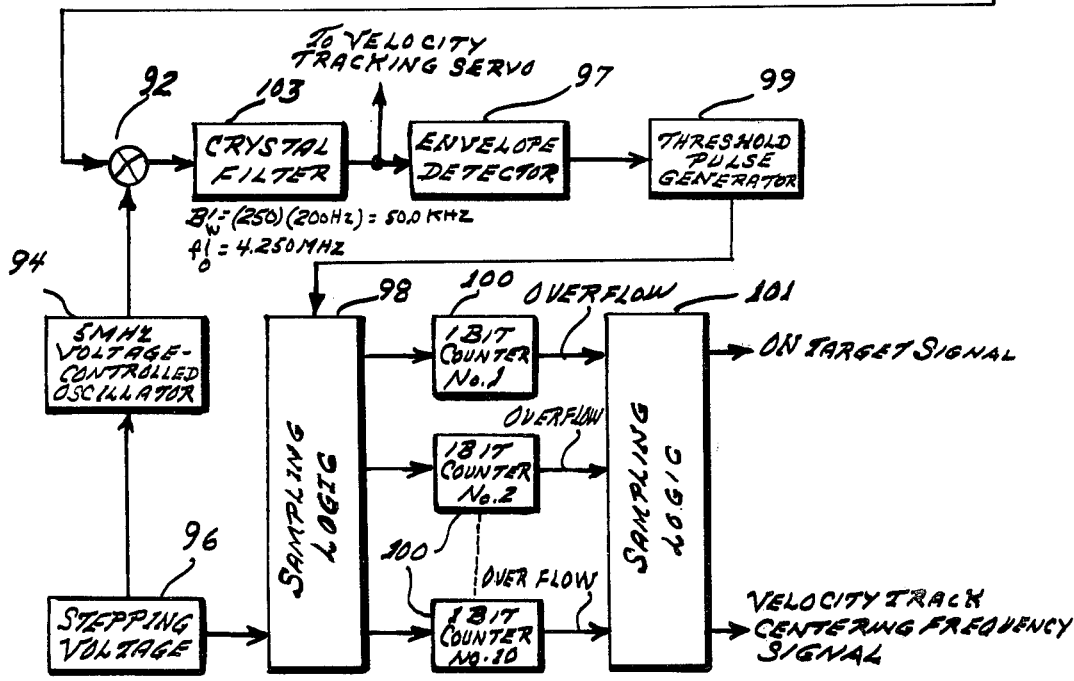
FIG. 5

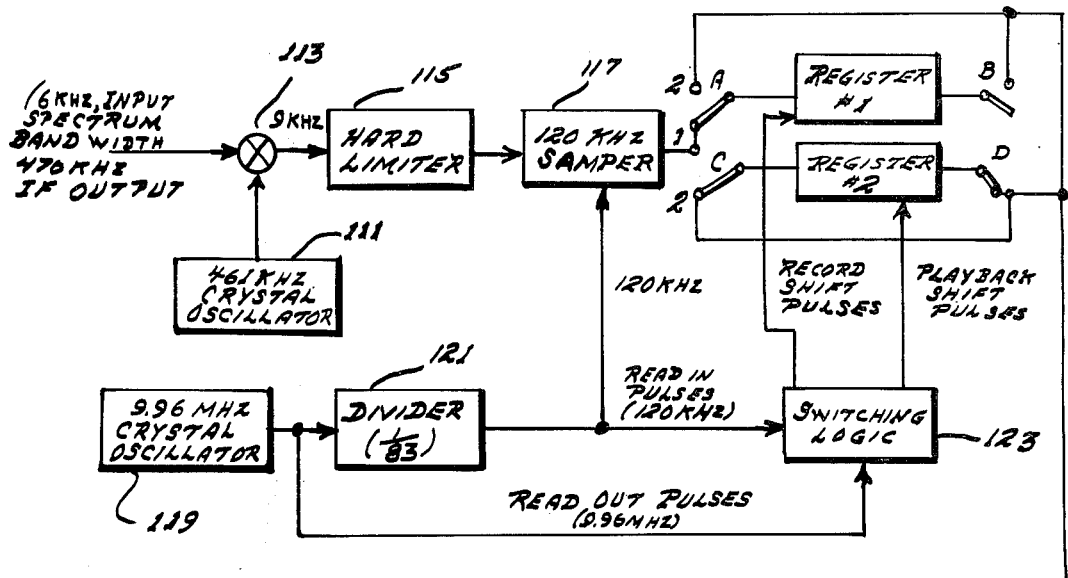
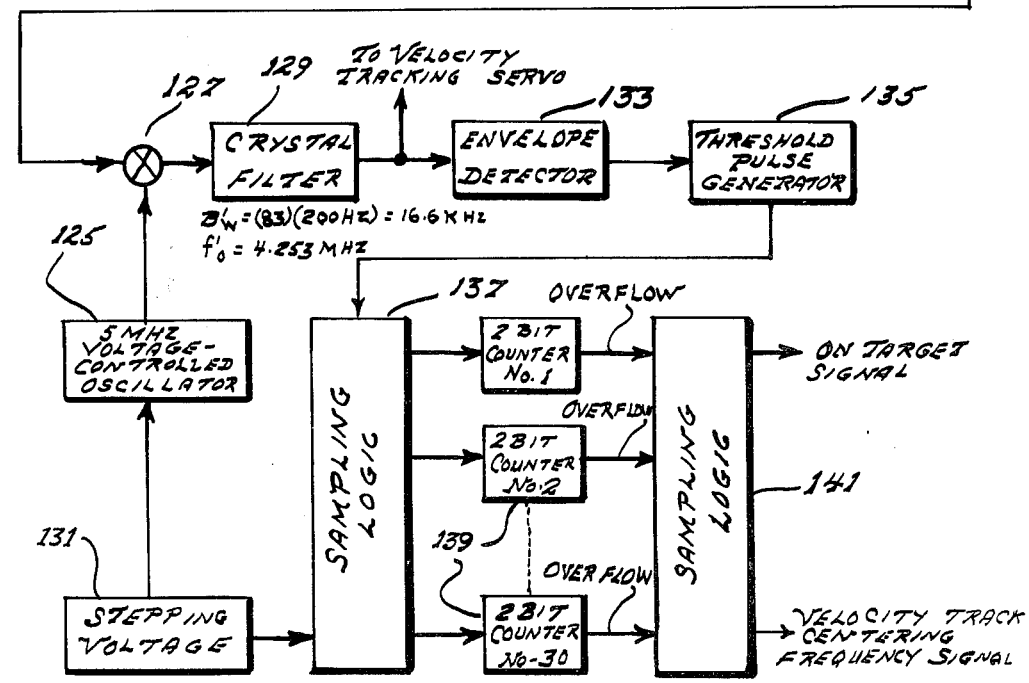
FIG. 6

SINGLE BIT DOPPLER PROCESSOR FOR GUIDANCE MISSILE SYSTEM

BACKGROUND OF THE INVENTION

This invention relates to missile guidance systems, and more particularly to a high PRF or CW doppler processor using the single bit playback principle.

The prior art requires the use of a large number of similar narrow band doppler filters with the results that these systems grow linearly in both size and cost as either the required doppler coverage is increased or the doppler filter bandwidth is decreased. This invention eliminates this need for a large number of expensive narrow band filters.

The use of digital techniques enables a designer to choose filter characteristics with a degree of freedom not available with the sole use of analog devices. A missile can operate with 400 Hz doppler filters, yet target spectrums of 10 to 200 Hz are expected. By narrowing the radar processing doppler filters, predetection S/N ratios can be improved from 3 to 13 db.

The acquisition time for the missile can be reduced by matching the processor's search band to the expected uncertainty in target doppler. The missile acquisition filter band configuration consisting of five filters, limits a single look search to a 2 KHz band. Therefore, when the target acquisition uncertainty exceeds 2 KHz (as it does for all modes), the search band must be stepped in frequency until the region of uncertainty is covered. Each step requires the same illumination period so that for $n$ steps, $n$ illumination periods are required. By widening the bank, the number of illumination periods required for acquisition can be reduced. One of the advantages of this invention is to increase the single look search band from the present 2 KHz to 5 to 10 KHz without increasing the size or cost of the processor.

A continuous mode missile tends to be detection range limited, while a sample data missile tends to be angle tracking limited. Pause-on-target (POT) performance studies indicate that it is desirable to increase the S/N ratio over that which is available, with missile range tracking doppler filters. Narrow band doppler filters can yield at least 3 db (200 Hz filters) improvement over a 400 Hz angle tracker and approximately 10 db over a 2000 Hz tracker.

Investigation of digital processing techniques has indicated that a hybrid missile radar processor (one that employs digital storage and analog filters) is not only feasible but has significant advantages over the classical all-analog approach to processing.

Present analog processors are essentially all-analog devices that operate in real time with data which is continuous. As a result, the processor requires many distinct circuits to perform similar but simultaneous operations. For example, five acquisition circuits are required to detect a target in a 2 KHz band and determine its doppler shift within 400 Hz. If the acquisition band were extended to 4 KHz, then 10 circuits are required.

In contrast with the requirements of analog devices, digital devices are not constrained to operate in real time nor are they required to be supplied with a continuous flow of data. Furthermore, the flexibility of digital equipment enables multiple use of a single device.

The playback radar processor employs a relatively fast sampling rate, $f_s$, (40 KHz as an example) to record the sum channel signal into a storage unit. Recording of the data continues for the duration of the required integration period $\tau$. At the end of this period, the digital storage unit is read out at a rate, R, significantly higher (2 to 20 MHz) than the sampling rate.

SUMMARY OF THE INVENTION

An air-to-air pulse doppler radar guided missile employs a self-contained processor to detect the spectra of its assigned target radar echo by utilization of the doppler effect, and analyze the target echo to determine the missile-to-target boresight angle. Current missile designs are implemented with analog devices. The purpose of this invention is to use digital devices in missle radar processors which effect their performance in such areas as intercept range, multiple launch capability, tracking range, processor size, weight, cost, and reliability.

The missile must operate in either one or a combination of the Continuous or Single Target Track Mode, or the Pause-on-Target (POT) or Time Share Illumination Mode. In the continuous mode (continuous target illuminatin), the missile acquires the target signal by doppler discrimination. This signal controls a doppler (i.e., velocity) tracking loop which centers the target signal in the angle tracker's doppler filters which in turn guides the missile to the target. Since the target is continuously illuminated, a relatively long postdetection integrator is employed to enhance detection performance.

The Pause-On-Target mode of operation has a moderate sampling rate (½ to 4 samples/s) and a moderate duty cycle (5 to 20 percent). When operating in this mode, the missile frees the illuminating radar to perform other tasks. A particular case of interest involves using the missile in the POT mode to enable the interceptor to launch and direct missiles to more than a singlet target.

In the Pause-on-Target mode, the missile acquires its target (using doppler discrimination) each time the target is illuminated by the interceptor. After acquisition, the missile velocity and angle tracking loops operate in the same manner as in the continuous mode. However, since the illumination interval is limited, the resultant data is noisier.

Since illumination is not continuous, the missile is not able to continually velocity or angle track the target. As a result of possible target maneuvers between samples, each successive reacquisition is essentially an independent operation. Therefore, as the sample interval is increased, the doppler search region (i.e., the frequency range of the expected target doppler) is also increased.

It is therefore an object of the invention to provide a coherent, narrow band detection system for radar target echoes.

It is another object to provide a device for producing a signal for narrow band angle tracking.

It is still another object to provide a novel means for tracking doppler rate from the target.

It is still another object to provide a system for digitally processing radar signals without a multi-bit analog-to-digital converter.

These and other advantages, features and objects of the invention will become more apparent from the following description taken in connection with the illustrative embodiment in the accompanying drawings, wherein:

FIGS. 3A and 3B are block diagrams of a basic missile guidance system;

FIG. 4 is a block diagram showing a missile acquisition and confirm channels of that shown in FIG. 3;

FIG. 5 is a block diagram of a digital processor for the continuous mode; and

FIG. 6 is a block diagram of the digital processor for Pause-on-Target mode.

DETAILED DESCRIPTION

Figure 1:
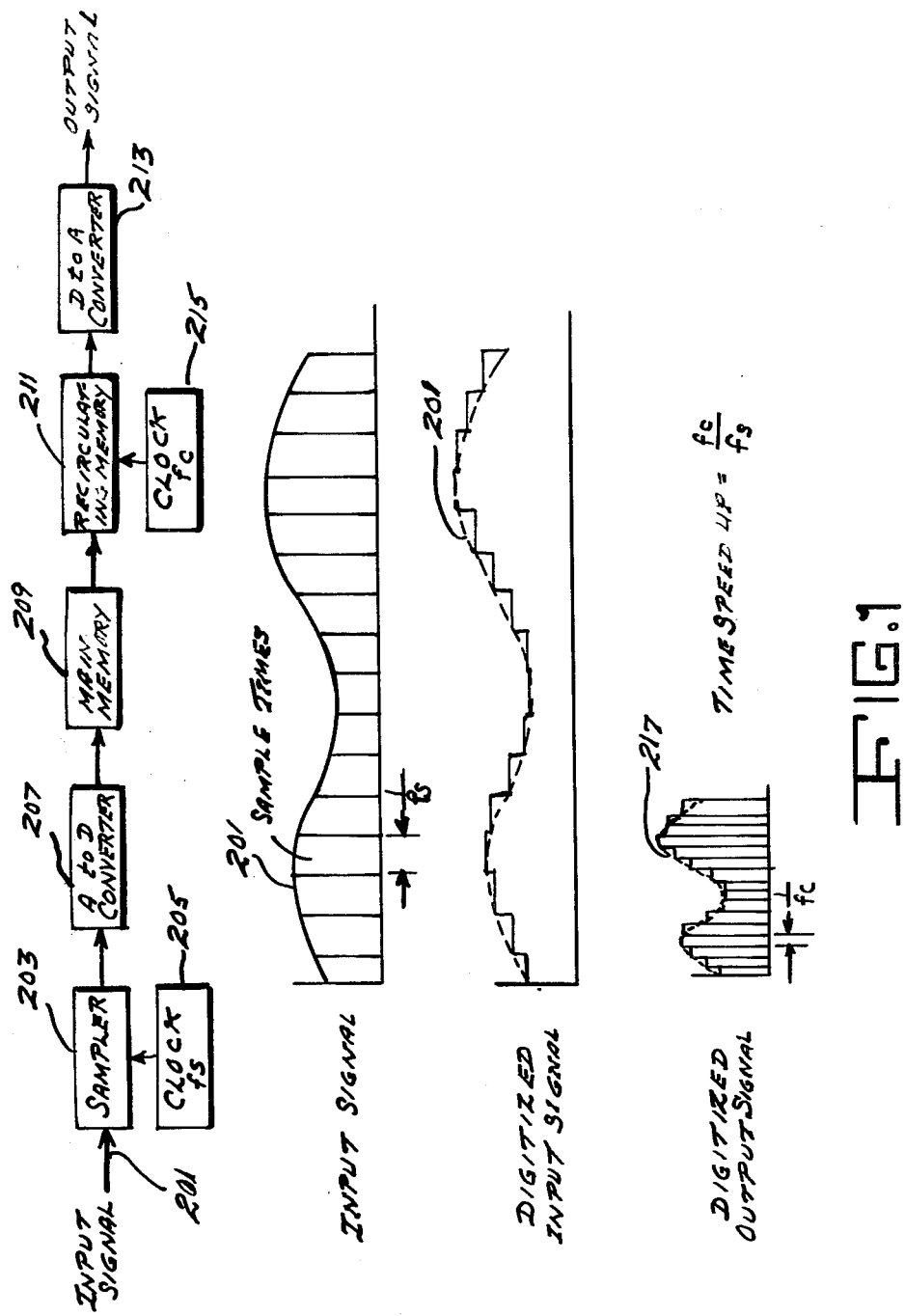
FIG. 1 shows the technique of a multi-bit digital processor.
Figure 2:
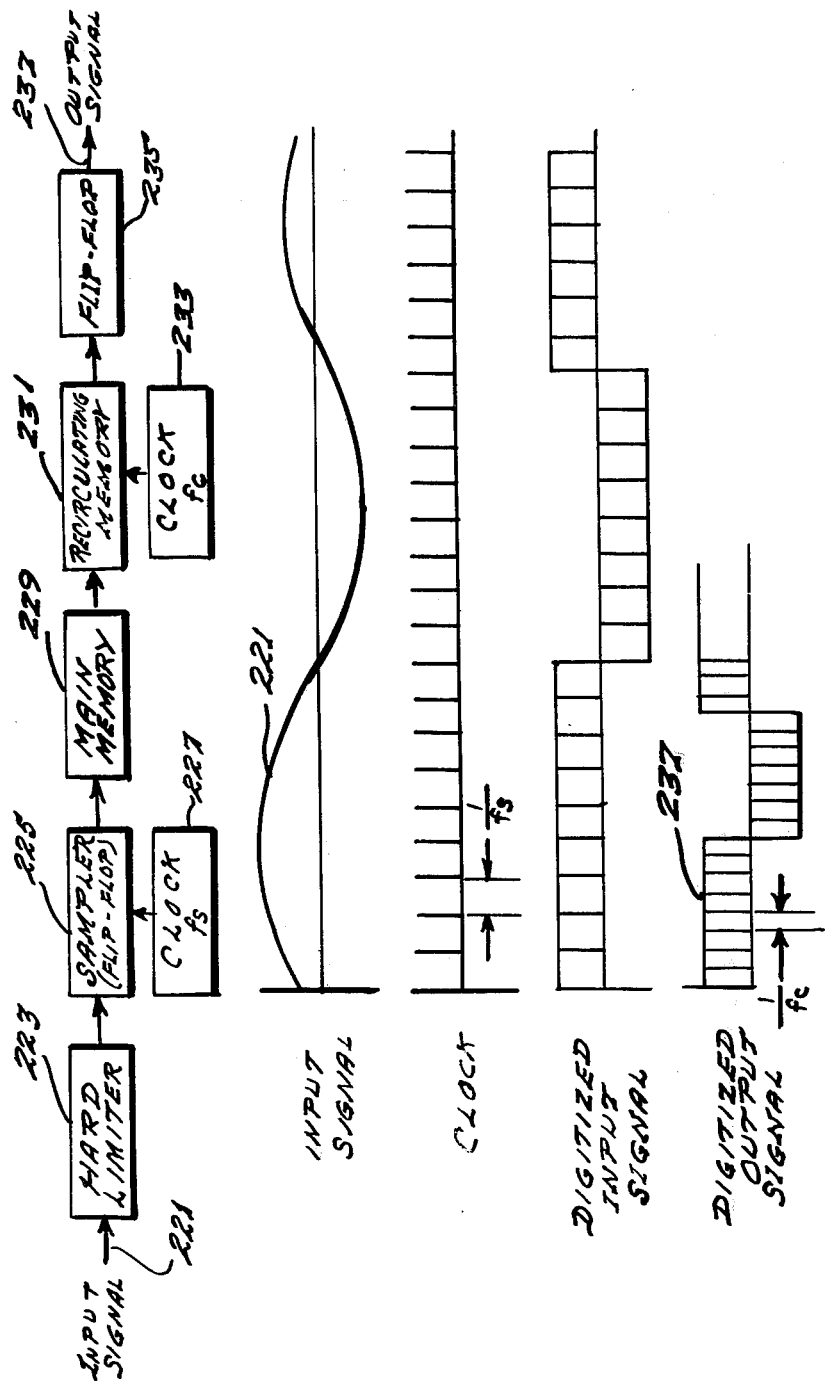
FIG. 2 shows the technique of a single bit quantizer.

The technique of multi-bit playback is shown in FIG. 1 where input signal 201 is fed to sampler 203 and sampled at a rate of $f_s$ as controlled by clock 205. The samples are digitized in analog-to-digital converter, stored in main memory 209, and then fed to recirculating memory 211 where digital-to-analog converter 213 converts them back to analog values at a sampled rate of $f_c$ as controlled by clock 215, the replay being at a much faster rate than the original sampling. Amplitude information is retained depending upon the degree of quantization along with zero crossing information. It is seen that the basic information contained in the recorder and replayed signals 217 is identical. The use of a singlet bit quatizer is shown in FIG. 2 where input signal 221 is fed to hard limiter 223 and then to sampler 225 where the signal is sampled at a rate $f_s$ as controlled by clock 227. The samples are fed to main memory 229 and then to recirculating memory 231 where the values are sampled at a rate $f_c$ as controlled by clock 233. Flip-flop 235 converts the values to output signal 237.

The high ratio of read out rate to sampling rate ($R/f_s \approx 100$) enables time-sharing a single velocity acquisition circuit. The additional hardware required to record, store, and read out the sum channel signal is less than, or equal to, the analog circuitry. Furthermore, the predetection doppler filter is matched to the expected target spectrum by the capacity of the storage unit and the read out rate. Also, the doppler bandwidth and search bandwidth can be increased over the analog system without and additional peripheral equipment.

A partial diagram of a conventional missile guidance system is shown in FIG. 3. For purposes of clarity several of the components that are not essential to the understanding of the invention have been omitted. The guided missile uses a monopulse antenna 11 divided into four quadrants for gating target information. The four antenna outputs are processed in microwave sum and difference circuits 13 to yield a sum channel signal 15 and two error channel signals 17 and 19. The sum channel 15 signal is for target detection and velocity tracking, while error channel signals 17 and 19 are for target angle tracking. An internal reference 21 serves as the local oscillator signal for mixers 23–25 where the RF signals are converted to the first IF and passed through three crystal filters 27–29, each having a 2 KHz pass band. The two error channels are mixed in modulators 31 and 33 with lobing signals from lobing reference 35 and added to the sum channel in mixer 37 to form a single IF channel containing an AM signal. After a second mixing with oscillator 39 in mixer 41 and filtering in filter 43, the error channel side bands are phase detected to generate the target pitch and yaw angular error voltage $V_R$. The output of filter 43 is fed to pitch phase detector and yaw phase detector 47 which are also fed by lobing reference source 35. The output of filter 43 is also fed to mixer 49 where it is mixed with the signal from oscillator 51 and then filtered in filter 53. The sum channel signal then passes through limiter 55 and into acquisition filter bank 57 consisting of five crystal filters. Each filter in the present example has a 400 Hz pass band. The filters serve to divide up the incoming 2 KHz sum channel bandwidth into five equal subchannels. Each filter is followed by an envelope detector 59, a post-detection filter 61, and a latching threshold detector 63. Presence of a target return in one of the filters produces a voltage output from threshold detector 63. A centering signal is then generated by the sampling logic 65 to slew the internal reference such that the target return lies in the center filter of acquisition bank 57. Also, 600 Hz confirm channel filter 67 is centered on the target. If the threshold crossing was not due to false alarm, the confirm channel signal after passing through envelope detector 69 and post-detection filter 71 is fed to threshold detector 73 which yields an on-target signal which permits continuous velocity tracking of the target. A slewing voltage developed in the velocity track module 75 continuously adjusts the internal reference frequency such that the target return is maintained in the 600 Hz confirm channel crystal filter.

The hybrid digital processing technique of the present invention replaces the components between dashed lines A—B and B—B of FIG. 3, including the five acquisition subchannels and the confirm channel.

In the continuous target illumination mode, the missile acquisition channel and the confirm channel of FIG. 3, which is shown in detail in FIG. 4, is replaced by the single bit playback digital processor as shown in the block diagram of FIG. 5. The principal function of the signal processor is to determine the presence of a target within the bandpass of the missile receiver. The main difference between the digital processor and the analog processor is that instead of dividing the 2 KHz receiver bandpass into narrow segments and sampling these segments in prallel, the digital processor samples the 2 KHz bandpass for $\tau = 6$ ms and stores the information being sampled in a shift register. The data is then serially examined in 200 Hz increments.

A 467 KHz crystal oscillator 81 mixes the incoming spectrum down to a center frequency of 3 KHz. In order to minimize crosstalk due to the 1-bit quantizing an sampling process, it is desirable to center the signal spectrum about 3 KHz. The output of mixer 83 is applied to the hard limiter 85 which converts the incoming signal to a 1-bit digital signal (i.e., two level) while preserving the phase information contained in the original signal. Limiter 85 is then sampled at a 40 KHz rate in sampler 87 and stored in shift register 89. The sampler rate is controlled by crystal oscillator 91 and divider 93. Divider 93 also feeds switching logic circuit 95 which is also fed by direct feed from oscillator 91.

Shift register 89 records quantized (two level) data 20 for six ms at a 40 KHz read in rate. It then replays the data ten times and variable voltage control oscillator 94 in the data processor is stepped 50 KHz each time by stepping voltage source 96. About 0.024 ms is required for playback so the 10 playbacks require 0.24 ms. Another 6 ms of data is read into shift register 89 and this data is played back 10 times for another 0.24 ms interval. This process is repeated two more times until a total of 24 ms worth of data has been examined. When the output of envelope detector 97 exceeds a preset threshold, a threshold pulse from generator 99 is fed into counter 100 as controlled by sampling logic circuit 98 and indicates the spectral region under examination. Sampling logic circuit 101 then selects the first counter that it examines in its scan pattern which has an overflow overflow during this 25 ms period. This information is used to slew the internal frequency reference so that the target is in the center of the input bandpass filter. The confirm test requires another 25 ms integration period. Presence of a target in counter No. 5 sends an on-target signal to velocity track. Data processor variable control oscillator 94 is then held fixed at 5 MHz and the crystal filter 103 output is sent to velocity track for continuous tracking.

A frequency discriminator in velocity track develops an error voltage in which is integrated to cut down the noise and used to slew the internal reference so that the target return can continuously be kept at the proper frequency. If a target return was not found to be present during the confirm interval in which the central 200 Hz segment of the 2 KHz input band was searched, then the search sequence continues as before.

The analog system would use five subchannels, such 400 Hz wide. The reduction in bandwidth to 200 Hz for the playback processor improves the signal-to-noise ratio and increases the detection range by ¼ db.

In a nuclear environment, a bipolar shift register must be used. Bipolar shift registers have small storage capacities and higher per-bit cost than a MOS FET shift register. A shift register is used of capacity sufficient to store only 6 ms worth of input data. A set of counters stores the threshold crossings produced when the 6 ms shift register is successively used to store data and then play it back several times. With this technique, long effective integration times can be provided without requiring a high capacity shift register. Since a 6 ms integration time is the minimum integration time corresponding to a 200 Hz target spectrum width, it is seen that the shift register must have (6 ms) (40,000 bits/s) = 240 bits storage capacity. It is anticipated that bipolar shift registers in the future will have only 16 bit storage capacity; hence, 15 registers are required. Since a 25 ms effective integration time is desired, it is necessary to store and have multiple playbacks of four 6 ms data samples during which the counters are examined for overflow. The advantage of the digital processing system is that a single crystal filter is sequentially tuned to different segments of the stored receiver bandpass rather than a bank of $n$ subfilters, as required for equivalent performance in the analog missile.

In the pause-on-target mode, the interceptor illuminates two or more targets per scan interval. Each target is illuminated only a fraction of the time. This mode, not provided for in the analog design, is particularly feasible with the digital processing scheme. Since the missile receives target illumination for only short periods of time, about ½ s per frame time or about 1.5 s, the input filter bandwidth which was 2 KHz for the continuous mode is widened to 6 KHz for the pause-on-target mode in order to prevent accelerating targets from moving out of the input receiver bandwidth between target illuminations. For the analog system to cover this bandwidth, a total of 15 crystal filters would be required if each filter had a 400 Hz bandwidth. The single bit playback digital processor covers this same bandwidth by using just one crystal filter and playing back the stored information 30 times in 200 Hz segments.

In the pause-on-target mode, the limited capacity of the bipolar shift register becomes more of a liability. Since the input data band is 6 KHz wide, the sampling frequency has to be 120 KHz. Then a 6 ms sampling period yields a required shift register storage capacity of (6 ms) (120,000 bits/s) = 720 bits. Thus 720/16 = 45 bipolar shift registers are required. If a 10 MHz read out rate is used, it takes (6 ms/250) (30) = 0.72 ms to play back the 6 ms of input data a total of 30 times. For a 48 ms effective integration period, it takes (8) (0.72 ms) = 5.76 ms additional time to read out the data. Thus, approximately 12 percent of the input data is lost without a buffer. The use of a complete buffer unit, such as is shown in the processor block diagram of FIG. 6, will double the number of shift registers and reduce the required playback rate.

The pause-on-target hybrid digital processor of FIG. 6 is basically similar to the processor for the continuous mode. A 461 KHz oscillator translates in mixer 113 the incoming signal from 470 to 9 KHz. The input spectrum is quantized in hard limiter 115 and sampled at 120 KHz rate in sampler 117 with a sampling frequency being twenty times the input spectrum bandwidth. A 9.9 MHz crystal oscillator 119 controls crystal oscillator circuit 123 through divider 121 and is used to derive the 120 KHz sampling rate.

The 720 bit shift register stores 6 ms worth of target data. During the first 6 ms period, switch A is connected to contact 1 with switch B open. The switching logic feeds 120 KHz shift pulses into shift register No. 1 for this 6 ms read-in period. Then switch A is connected to contact 2 with switch B closed, and the contents of shift register No. 1 are read out at a 4.8 MHz rate. While the contents of shift register No. 1 are being read out, shift register No. 2 is used as a buffer to store the next 6 ms worth of data. The contents of shift register No. 1 are played back 30 times in order to cover the input 6 KHz spectrum in 200 Hz segments. The 30 playbacks take (30) (720 bits)/4.80 M bits/s = 4.5 ms to complete.

Since readout rate is 40 times the read in rate, the output spectrum is 6 × 40 or 240 KHz wide and centered at 40 × 9 or 360 KHz. 5 MHz variable control oscillator 125 center frequency translates the signal up to a 4.5 MHz center frequency in mixer 127 and then passes the signal through crystal filter 129. Since the 6 KHz receiver input spectrum is split into 200 Hz segments, crystal filter 129 bandpass is 40 × 200 or 8 KHz wide. Digital processor variable control oscillator 125 is stepped 8 KHz by stepping voltage source 131 each time the shift register is played back 30 times until the entire 240 KHz spectrum is covered. The signal is fed to envelope detector 133. If a threshold is crossed, threshold pulse generator 135 sends a pulse to sampling logic 137 which serves to connect the appropriate control 139 to the threshold pulse generator 135.

Thus, on playback No. 1 counter No. 1 is connected to the output of the threshold pulse generator. On playback No. 2, counter No. 2 is connected to threshold pulse generator output, et cetera. The counters keep track of whether or not a threshold was crossed on each playback. Each counter counts threshold crossings in the same 200 Hz segment of the input 6 KHz receiver spectrum.

In order to achieve an effective integration time of 48 ms, the preceding process is repeated eight times. For the first 6 ms interval, shift register No. 1 plays back its contents 30 times. The 30 counters store the threshold crossing pulses corresponding to the 30 different 200 Hz segments of the input spectrum. During this time, shift register No. 2 is storing data. For the next 6 ms interval, the contents of shift register No. 2 are played back 30 times and the counters store evidence of threshold crossings. During this time, shift register No. 1 stores new data. This process is repeated 6 more times until the required effective integration on time of 48 ms has been covered.

During the 48 ms period, the counters are sampled to see if an overflow has occurred. Sampling logic 141 scans the counter outputs in order from counter No. 1 to counter No. 30 and notes the first counter that has an overflow indication. Counters 139 are set to overflow if more than four threshold crossing pulses are sent to them. A maximum of eight threshold are possible, since each counter counts the output of eight 6 ms integration periods. After the sampling logic indicates a possible target, a confirm test is applied in order to eliminate a possible false alarm. The sampling logic sends a centering signal to the internal frequency reference to slew the target return into the center of the 6 KHz input spectrum. Then the output of counter No. 15 is checked for overflow indications at the end of the next 48 ms period. If an overflow is present, then an on-target signal is sent to velocity track. Thereafter, for the rest of the target illumination interval, digital processor voltage controlled oscillator 125 is fixed at 5 MHz, and the output signal of crystal filter 129 is used for continuous velocity tracking of the target. At the end of the target illumination interval, the target return ceases and no further information is obtained until the next target illumination interval occurs. At this time, the previous search pattern is repeated until the target is again acquired and centered in the 60 KHz input spectrum.

What is claimed is:

1. A hybrid digital processor for a missile guidance system for obtaining velocity track and on target signals in a continuous mode comprising:
    a. a first mixer fed by an IF sum signal of the missile guidance system;
    b. a local oscillator fed to the first mixer;
    c. a limiter fed by the first mixer;
    d. a clock pulsed sampler fed by the limiter;
    e. a plurality of interconnected bipolar shift registers;
    f. switching means for controlling the input, output, and recirculation of the shift registers;
    g. a stepping voltage source;
    h. a voltage controlled oscillator fed by the stepping voltage source;
    i. a second mixer fed by the shift registers and the voltage controlled oscillator;
    j. an envelope detector fed by the second mixer;
    k. a threshold pulse generator fed by the envelope detector;
    l. a bank of one bit counters; and
    m. means for selecting one of the counters for pulsing, the selecting means being fed by the stepping voltage source and the threshold pulse generator with the outputs of the counters being velocity track and on target signals.

2. A hybrid signal digital processor for a missile guidance system for obtaining velocity track and on target signals in a pause-on-target mode comprising:
    a. a first mixer fed by an IF sum signal of the missile system;
    b. a local oscillator fed to the first mixer;
    c. a limiter fed by the first mixer;
    d. a clock pulsed sampler fed by the limiter;
    e. a pair of shift registers fed by the sampler with each register of the pair having an input and output and each register of the pair having switching means for feeding the input to the output;
    f. a switching logic circuit connected to the pair of shift registers and the associated switching means for controlling the switching and the pulsing thereof;
    g. a stepping voltage source;
    h. a voltage controlled oscillator fed by the stepping voltage source;
    i. a second mixer fed by the pair of shift registers and the voltage controlled oscillator;
    j. an envelope detector fed by the second mixer;
    k. a threshold pulse generator fed by the envelope detector;
    l. a bank of two bit counters; and
    m. means selecting one of the counters for pulsing, the selecting means being fed by the stepping voltage source and the threshold pulse generator with the outputs of the counters being velocity track and on target signals.

* * * * *